(12) United States Patent
Nomi et al.

(10) Patent No.: US 12,535,897 B2
(45) Date of Patent: Jan. 27, 2026

(54) COMPUTER, COMPUTER-READABLE MEDIUM, AND STROKE DATA DISPLAY CONTROL METHOD

(71) Applicant: Wacom Co., Ltd., Saitama (JP)

(72) Inventors: Tsukasa Nomi, Saitama (JP); Hideki Fujimaki, Saitama (JP); Shoichi Sue, Saitama (JP); Yutaka Furuta, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/778,423

(22) Filed: Jul. 19, 2024

(65) Prior Publication Data
US 2024/0371057 A1    Nov. 7, 2024

Related U.S. Application Data

(63) Continuation of application No. PCT/JP2022/048545, filed on Dec. 28, 2022.

(30) Foreign Application Priority Data

Jan. 20, 2022 (JP) ................. 2022-007373

(51) Int. Cl.
*G06F 3/0354* (2013.01)
*G06T 11/00* (2006.01)
(Continued)

(52) U.S. Cl.
CPC ........ *G06F 3/03545* (2013.01); *G06T 11/001* (2013.01); *G06T 11/203* (2013.01); *G06V 30/347* (2022.01)

(58) Field of Classification Search
CPC .. G06T 11/203; G06T 11/001; G06F 3/03545; G06F 3/0354; G06F 3/038; G06V 30/347; G09B 7/02
See application file for complete search history.

(56) References Cited

U.S. PATENT DOCUMENTS

2012/0113455 A1   5/2012  Ebitani et al.
2012/0206397 A1*  8/2012  Zawacki ............. G06F 3/04883
                                                    345/173
(Continued)

FOREIGN PATENT DOCUMENTS

CN      102184652 A    9/2011
JP      2012-100137 A  5/2012
(Continued)

OTHER PUBLICATIONS

English Translation of International Search Report for International Application No. PCT/JP2022/048545, mailed Feb. 28, 2023. (3 pages).

(Continued)

*Primary Examiner* — Premal R Patel
(74) *Attorney, Agent, or Firm* — Seed Intellectual Property Law Group LLP (57) ABSTRACT

The present disclosure makes it possible to realize with ease whether a student has been able to answer a question in an expected state. A computer includes a processor and a memory storing a program that, when executed by the processor, causes the computer to acquire a plurality of pieces of stroke data, determine whether the pieces of stroke data have been input in a particular state, and control a display state when the pieces of stroke data are displayed based on a result of determining whether the pieces of stroke data have been input in the particular state.

20 Claims, 6 Drawing Sheets

(51) Int. Cl.
*G06T 11/20* (2006.01)
*G06V 30/32* (2022.01)

(56) References Cited

U.S. PATENT DOCUMENTS

2016/0147436 A1* 5/2016 Tsutsui ............... G06F 3/04883
 715/268
2017/0371485 A1* 12/2017 Ohi ....................... G06F 3/0383
2019/0272766 A1 9/2019 Horie

FOREIGN PATENT DOCUMENTS

| JP | 2019-113803 A | 7/2019 |
| JP | 2020-016871 A | 1/2020 |
| JP | 2021-119374 A | 8/2021 |
| WO | 2018/092555 A1 | 5/2018 |

OTHER PUBLICATIONS

Ilyama et al., "Detecting Answer Stuck Point Using Time Intervals of Pen Strokes," *Transactions of Japanese Society for Information and Systems in Education* 34(2):166-171, 2017. (with English Machine Translation).

* cited by examiner

| 1 | STROKE START TIME | STROKE END TIME | SERIES OF COORDINATE DATA | STATE FLAG |
|---|---|---|---|---|
| 2 | STROKE START TIME | STROKE END TIME | SERIES OF COORDINATE DATA | STATE FLAG |
| 3 | STROKE START TIME | STROKE END TIME | SERIES OF COORDINATE DATA | STATE FLAG |
| ⋮ | ⋮ | ⋮ | ⋮ | ⋮ |

FIG.4

QUESTION 1: POSITIVE NUMBERS AND NEGATIVE NUMBERS/RECOGNIZED RESULT　　TO NEXT

Ink to Math　Ink DATA $$5 \times (-11) - 63 \div (-7)$$
$$= -55 - 63 \div (-7)$$
$$= -55 - (-9)$$
$$= -55 + 9$$
$$= -46$$

$5 \times (-11) - 63 \div (-7)$
$= -55 - 63 \div (-7)$
$= -55 - (-9)$
$= -55 + 9$
$= -46$

COMPUTER, COMPUTER-READABLE MEDIUM, AND STROKE DATA DISPLAY CONTROL METHOD

BACKGROUND

Technical Field

The present disclosure relates to a computer, a computer-readable medium, and a stroke data display control method, and more particularly to a computer and a computer-readable medium storing a program that utilize stroke data, and a stroke data display control method for controlling the display of stroke data.

Description of the Related Art

In recent years, there have been provided learning or art education services using tablet terminals. According to the services of the kind described, a grader, for example, acquires student's answers to questions by way of ink data including a plurality of pieces of stroke data, making it possible to reproduce the process of inputting the answers. Patent Document 1 discloses a technology regarding the reproduction of such an inputting process.

PRIOR ART DOCUMENT

Patent Document

Patent Document 1: WO2018/092555

BRIEF SUMMARY

Technical Problems

According to the background art described above, however, the grader is unable to know whether the student was able to answer without suffering setbacks and whether the student wrote the answers in the correct stroke order unless the inputting process is reproduced. Therefore, a need has arisen in the art for a technology that allows a grader to realize with ease whether the user has been able to answer in an expected state or not.

It is therefore an object of the present disclosure to provide a computer, a computer-readable medium storing a program, and a stroke data display control method that make it possible to realize with ease whether the user has been able to answer in an expected state or not.

Technical Solution

A computer according to the present disclosure is a computer including a processor and a memory storing a program that when executed by the processor acquire a plurality of pieces of stroke data, determine whether the pieces of stroke data have been input in a particular state, and control a display state when the pieces of stroke data are displayed based on a result of determining whether the pieces of stroke data have been input in the particular state.

A non-transitory computer-readable medium according to the present disclosure stores a program that, when executed by a processor, causes a computer to acquire a plurality of pieces of stroke data, determine whether the pieces of stroke data have been input in a particular state, and control a display state when the pieces of stroke data are displayed based on a result of determining whether the pieces of stroke data have been input in the particular state.

A stroke data display control method according to the present disclosure is a stroke data display control method including acquiring, by a computer, a plurality of pieces of stroke data, determining, by the computer, whether the pieces of stroke data have been input in a particular state, and controlling, by the computer, a display state when the pieces of stroke data are displayed based on a result of the determining.

A computer according to the present disclosure may be a computer including a processor and a memory storing a program that when executed by the processor, causes the computer to acquire ink data including a plurality of pieces of stroke data, determine whether the pieces of stroke data have been input in a particular state, and control a display state when the ink data are displayed based on a result of determining whether the pieces of stroke data have been input in the particular state.

A non-transitory computer-readable according to the present disclosure stores a program may be a program that, when executed by a processor, causes a computer to acquire pieces of ink data including a plurality of pieces of stroke data, determine whether the pieces of stroke data have been input in a particular state, and control a display state when the pieces of ink data are displayed based on a result of determining whether the pieces of stroke data have been input in the particular state.

An ink data display control method according to the present disclosure is an ink data display control method including acquiring, by a computer, pieces of ink data including a plurality of pieces of stroke data, determining, by the computer, whether the pieces of stroke data have been input in a particular state, and controlling, by the computer, a display state when the pieces of ink data are displayed based on a result of the determining.

Advantageous Effect

According to the present disclosure, it is possible to realize with ease whether the user has been able to answer in an expected state or not from the appearance of ink data.

DETAILED DESCRIPTION

An embodiment of the present disclosure will be described in detail hereinbelow with reference to the accompanying drawings.

Figure 1:
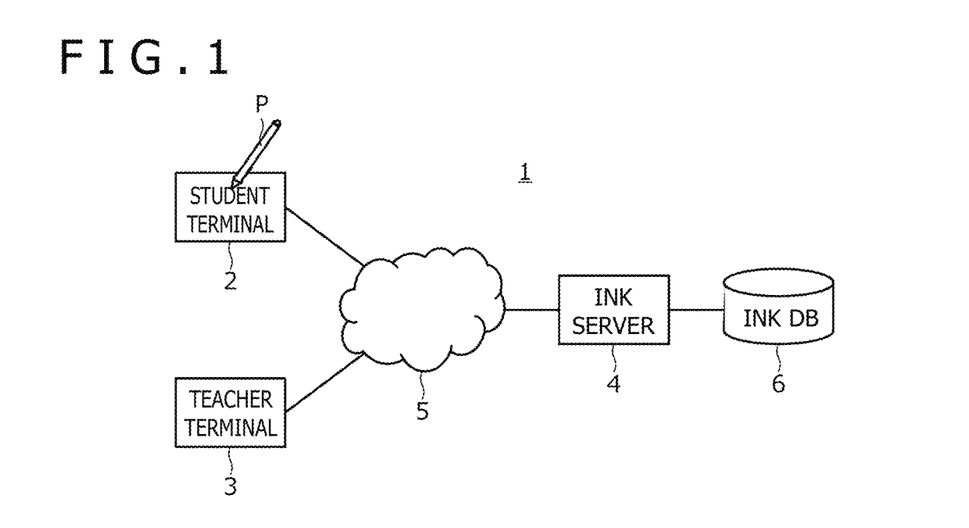
FIG. 1 is a diagram illustrating a system configuration of an ink data processing system 1 according to an embodiment of the present disclosure.

FIG. 1 is a diagram illustrating a system configuration of an ink data processing system 1 according to the embodiment of the present disclosure. As illustrated in FIG. 1, the ink data processing system 1 has a configuration in which a student terminal 2, a teacher terminal 3, and an ink server 4 are interconnected by a network 5. An ink database 6 is connected to the ink server 4.

Figure 2:
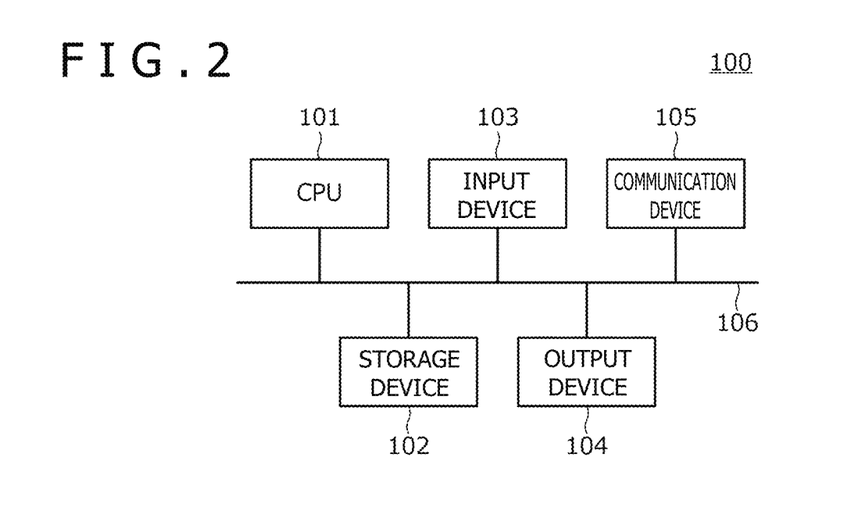
FIG. 2 is a diagram illustrating an example of a hardware configuration of each of a student terminal 2, a teacher terminal 3, and an ink server 4 shown in FIG. 1.

FIG. 2 is a diagram illustrating by way of example a hardware configuration of each of the student terminal 2, the teacher terminal 3, and the ink server 4 shown in FIG. 1. Each of the student terminal 2, the teacher terminal 3, and the ink server 4 can be constructed of a computer 100 that has the illustrated configuration. The ink server 4 may be constructed of a plurality of computers 100 that are joined together.

As illustrated in FIG. 2, the computer 100 is of a configuration in which a CPU (Central Processing Unit) 101, a storage device 102, an input device 103, an output device 104, and a communication device 105 are interconnected by a bus 106.

The CPU 101 refers to a device (processor) that controls the components of the computer 100 and reads and executes various programs stored in the storage device 102. The processing sequences to be described with reference to FIGS. 3 through 8 that will be referred to later are carried out when the CPUs 101 of the student terminal 2, the teacher terminal 3, and the ink server 4 execute the programs stored in the storage devices 102.

The storage device 102 includes a main storage unit such as a DRAM (Dynamic Random Access Memory) and an auxiliary storage unit such as a hard disk, and stores the operating system of the computer 100, various programs for running various applications, and pieces of data that are used by the programs.

The input device 103 refers to a device for accepting input operations from the user and supplying them to the CPU 101, and includes a keyboard, a mouse, and a touch detecting device, for example. The touch detecting device refers to a device including a touch sensor and a touch controller, and is used to detect stylus inputs or touch inputs. A stylus P illustrated in FIG. 1 refers to an electronic stylus used to apply stylus inputs to the touch detecting device of the student terminal 2. Stylus inputs are applied by the stylus P according to the active capacitance or electromagnetic inductive principles, for example. Touch inputs are applied by a passive pointer such as a user's finger according to the capacitance principles, for example.

The output device 104 refers to a device for outputting processed results from the CPU 101 to the user, and includes a display and a loudspeaker, for example. The communication device 105 refers to a device for communicating with external devices and sends and receives data according to commands from the CPU 101. Each of the student terminal 2, the teacher terminal 3, and the ink server 4 communicates with other devices, systems, and networks with use of the communication device 105.

Referring back to FIG. 1, the ink database 6 refers to a storage device for storing various pieces of data necessary for correspondence education. The various pieces of data include teaching material data provided to the student and ink data (hereinafter referred to as "answer ink data") representing the answers of the student to questions included in the teaching material data. The ink database 6 may be incorporated in a computer separate from the ink server 4 or incorporated in the storage device 102 of the ink server 4.

The ink server 4 refers to a server computer used by a service provider of correspondence education, and provides the teaching material data in the ink database 6 to the student terminal 2, acquires answer ink data from the student terminal 2 and stores the acquired answer ink data in the ink database 6, and generates a screen (hereinafter referred to as an "answer window") including the student's answers and provides the answer window to the teacher terminal 3. The ink server 4 also performs a process of determining whether pieces of stroke data that make up the answer ink data have been input in a predetermined state or not by analyzing the answer ink data stored in the ink database 6, and controlling a displayed state (appearance) of the answer ink data to be displayed in the answer window on the basis of the determined result.

The student terminal 2 refers to a computer that is used by a student of correspondence education as the user, and is configured to be able to run an application for the student. Typically, the student terminal 2 is a tablet terminal. However, the student terminal 2 may be a computer of other kind such as a laptop personal computer, a desktop personal computer, or a smartphone, providing it has a built-in or external input device to make it compatible with stylus inputs from the stylus P or touch inputs.

The application for the student refers to a program that enables the student terminal 2 to perform a process of receiving teaching material data from the ink server 4, displaying the received teaching material data on its display, and accepting answers to questions included in the displayed teaching material data. The student uses the application for the student by logging in with use of a student ID preassigned to the student.

The student terminal 2 that operates according to the application for the student specifies teaching material data to be acquired from the ink server 4 in response to a manipulating operation of the student, and requests the ink server 4 to send the specified teaching material data. The student terminal then receives the teaching material data that has been sent by the ink server 4 as a result of the request and displays the received teaching material data on the display.

The teaching material data refers to data representing a display screen that includes a plurality of questions, answer input fields for the respective questions, and a submission button for indicating an end of the inputting of answers. The questions and the answer input fields may be displayed on a plurality of display screens (pages). In the latter case, each of the pages includes a forward button for going to the next page and a backward button for returning to the previous page, and the submission button is provided on the final page or as a global navigation icon displayed in common to the pages. Each of the questions is assigned a question ID for identifying the question, and each of the answer input fields is also identified by the question ID assigned to the question. The student terminal 2 that operates according to the application for the student is configured to acquire answer ink data from each answer input field in response to a manipulating operation done by the student and, responsive to a pressing of the submission button by the student, send the pieces of answer ink data that have been acquired thus far together with the student ID and the respective question IDs to the ink server 4.

An inputting operation on an answer input field is carried out by a stylus input or a touch input. An inputting operation as carried out by a stylus input, for example, will be described below. The touch detecting device of the student terminal 2 performs a process of periodically detecting the position of the stylus P within a touch screen and acquiring pieces of stroke data representing a sequence of strokes on the basis of the detected result. The pieces of stroke data thus acquired represent pieces of data each including a series of coordinates indicative of the path followed by the stylus tip from a pendown (when the stylus contacts a touch surface) to a penup (when the stylus leaves the touch surface). Answer ink data represents a series of stroke data that have been input by the student in a corresponding answer input field.

Figure 3:
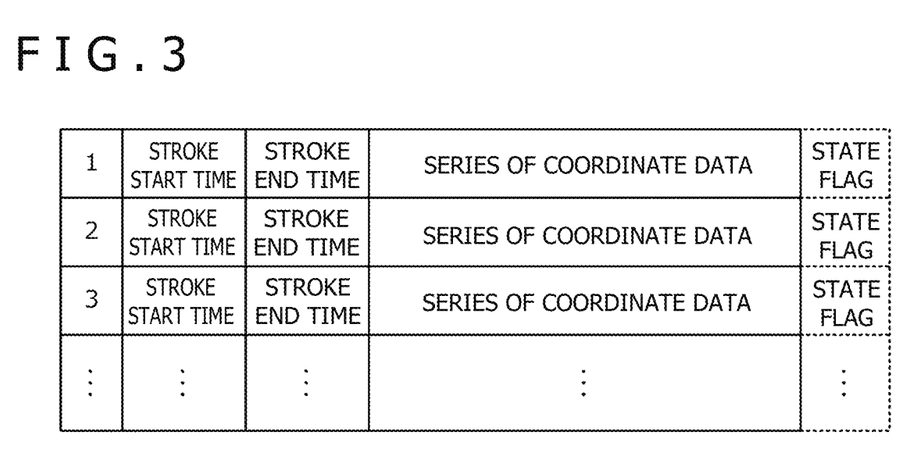
FIG. 3 is a diagram illustrating a makeup of answer ink data.

FIG. 3 is a diagram illustrating a makeup of answer ink data. As illustrated in FIG. 3, each of pieces of stroke data that make up answer ink data includes information (hereinafter referred to as a "stroke ID") representing the order of the inputting of the pieces of stroke data in the answer ink data, a time stamp representing a stroke start time (pendown time) indicative of the time when the student starts inputting strokes and a stroke end time (penup time) indicative of the time when the student ends inputting strokes, a series of coordinate data, and a state flag. The state flag refers to data that the ink server 4 adds to each stroke data in the answer ink data already stored in the ink database 6, and is not included in stroke data at the time it is output from the student terminal 2. Details of the state flag will be described later.

Individual pieces of coordinate data can include, besides coordinates indicative of the position of the stylus P in the touch surface, a stylus pressure value representing the value of a pressure applied to the tip of the stylus P, tilt data representing the tilt of the stylus P, and on/off information representing whether the switch included in the stylus P is turned on or off. Of these coordinate data items, the stylus pressure value and the on/off information are data acquired by the stylus P and sent from the stylus P to the touch detecting device of the student terminal 2. The tilt data is data acquired by the touch detecting device in a case where the stylus P has two stylus tip electrodes. The latter stylus P is arranged to send respective stylus signals from the two stylus tip electrodes. The touch detecting device calculates the distance between the two stylus tip electrodes by deriving respective positions according to the two stylus signals and acquires tilt data according to the calculated distance.

Referring back to FIG. 1, the teacher terminal 3 refers to a computer that is used by a teacher of correspondence education as the user, and is configured to be able to run an application for the teacher. Typically, the teacher terminal 3 is a personal computer such as a laptop personal computer or a desktop personal computer, although it may be a tablet terminal as with the student terminal 1, or a smartphone.

The application for the teacher refers to a program that enables the teacher terminal 3 to perform a process of receiving an answer window from the ink server 4 and displaying the received answer window. The teacher uses the application for the teacher by logging in using a teacher ID preassigned to the teacher.

The teacher terminal 3 that operates according to the application for the teacher specifies a student ID and a question ID in response to a manipulating operation of the teacher, and requests the ink server 4 to send an answer window corresponding to the student ID and the question ID that have been specified. The teacher terminal 3 then receives the answer window that has been sent by the ink server 4 as a result of the request and displays the received answer window on the display. The teacher can now grasp the answer of the student by viewing the answer window thus displayed. According to the present disclosure, furthermore, the teacher is also able to see whether the answer has been input in a predetermined state or not.

Figure 4:
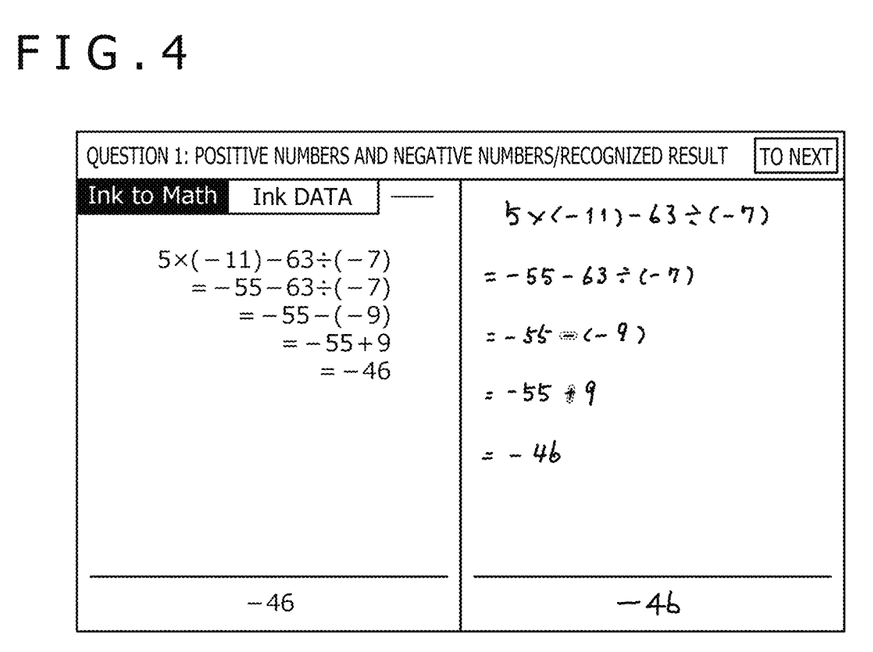
FIG. 4 is a diagram illustrating an example of an answer window displayed on a display of the teacher terminal 3.

FIG. 4 is a diagram illustrating by way of example an answer window displayed on the display of the teacher terminal 3. As illustrated in FIG. 4, the answer window is configured to display the results of a rendering of answer ink data on the right side and the results of an analysis of the answer ink data on the left side. The result of the analysis of the answer ink data can include, besides the result of the character recognition as illustrated in FIG. 4, the results of a detailed analysis of the answer ink data (a recording start time, a description start time, a description end time, a period of time from the start of a description to the submission thereof, a total description period of time, a total stroke length, an average description speed, an acceleration, an average stylus pressure, and a graph representing the relation between time and stylus pressure). The result of the analysis of the answer ink data may also include a pseudo-amount of ink used that is determined from the stroke length.

In FIG. 4, two of the pieces of stroke data included in the result of the rendering of the answer ink data are marked with broken-line round-corner rectangular symbols. The round-corner rectangular symbols indicate that the corresponding pieces of stroke data associated therewith are rendered in a color different from the other pieces of stroke data, and are not actually added to the pieces of stroke data. When rendering the stroke data in the answer window, the ink server 4 refers to the state flags illustrated in FIG. 3 and changes the rendering color according to the values of the state flags. By seeing the changed rendering color, the teacher is able to know that the strokes marked with the changed rendering color have not been input in the predetermined state.

Respective processes that are performed by the student terminal 2 and the ink server 4 will be described in greater detail below with reference to FIGS. 5 through 8.

Figure 5:
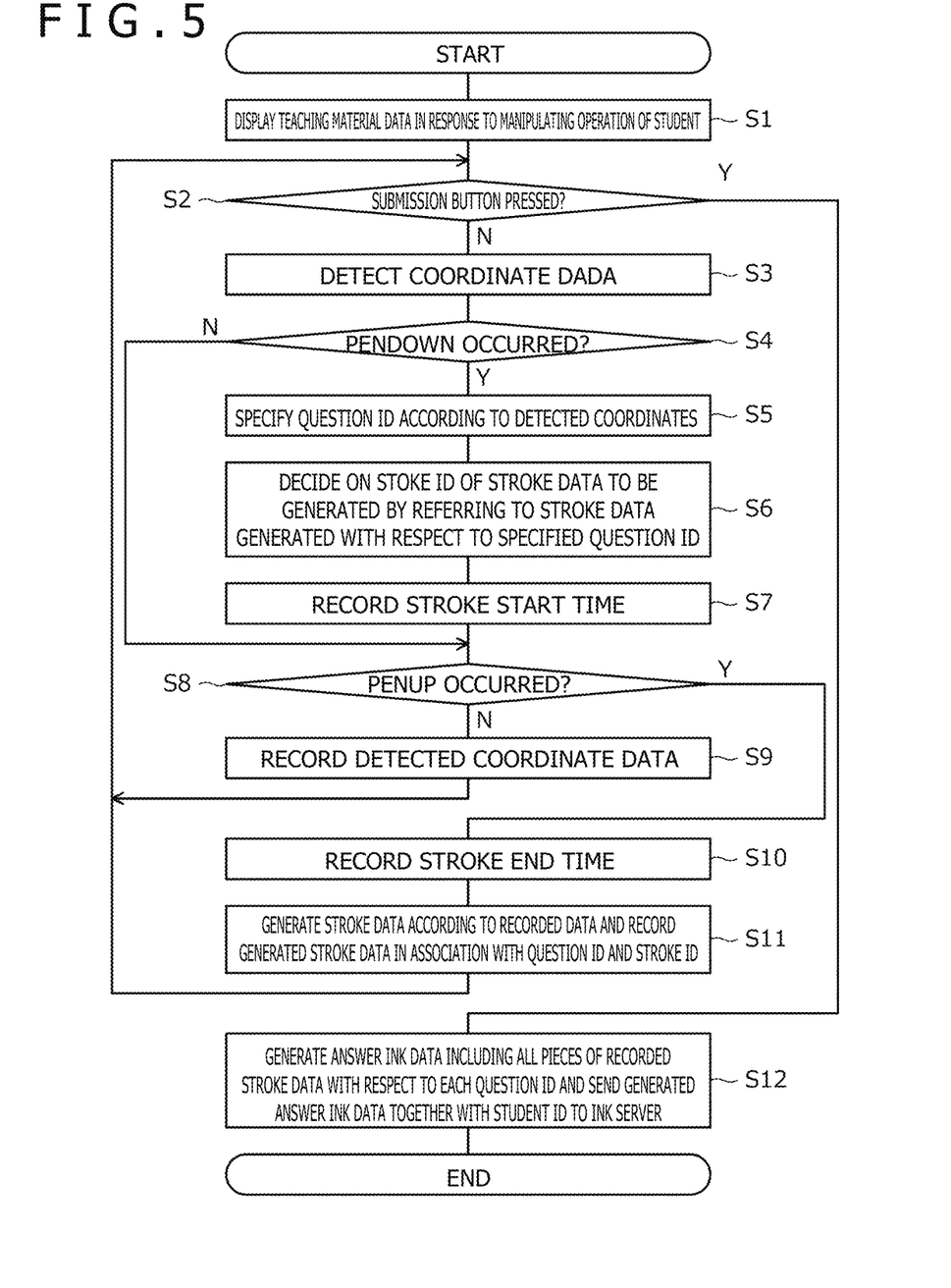
FIG. 5 is a processing flowchart illustrating a process carried out by the student terminal 2 for acquiring answer ink data.

FIG. 5 is a processing flowchart illustrating a process carried out by the student terminal 2 for acquiring answer ink data. As illustrated in FIG. 5, the process starts with processing (S1) in which the student terminal 2 displays teaching material data in response to a manipulating operation of the student. As described above, the teaching material data includes a display screen that includes a plurality of questions, answer input fields for the respective questions, and a submission button for indicating an end of the inputting of answers. For the sake of brevity, an example in which all the answer input fields and the submission button are included in one display screen will be described below. However, a plurality of answer input fields may be spread out and displayed on a plurality of pages, as described above.

The student terminal 2 that has displayed the teaching material data determines whether the submission button has been pressed or not (S2). If the student terminal 2 determines that the submission button has not been pressed, the student terminal 2 detects coordinate data (S3) and determines whether a pendown has occurred or not (S4). As described above, the coordinate data detected at S3 includes, besides coordinates indicative of the position of the stylus P in the touch surface, a stylus pressure value representing the value of a pressure applied to the tip of the stylus P, tilt data representing the tilt of the stylus P, and on/off information representing whether the switch included in the stylus P is turned on or off. The determined result from S4 is affirmative if the stylus pressure value in the coordinate data detected at S3 has changed from 0 to a value larger than 0, and negative if otherwise.

If the student terminal 2 determines that no pendown has occurred at S4, then the process carried out by the student terminal 2 goes to S8. If, conversely, the student terminal 2 determines that a pendown has occurred at S4, then the student terminal 2 first specifies a question ID according to the coordinates (=the position where writing has started) in the coordinate data detected at S3 (S5). The specified question ID here refers to a question ID corresponding to the answer input field including the position where writing has started.

Then, the student terminal 2 decides on the stoke ID of stroke data to be generated by referring to the stroke data generated with respect to the specified question ID (S6). As described above, the stroke ID represents information representing the order of the inputting of the stroke data in the answer ink data. Therefore, the student terminal 2 may decide on, as the stoke ID of stroke data to be generated, a number representing the sum of 1 and the largest one of one or more stroke IDs assigned to the stroke data generated with respect to the specified question ID. Then, after having recorded the present time as a stroke start time (S7), the student terminal 2 has its process go to S8.

At S8, the student terminal 2 determines whether a penup has occurred or not (S8). The determined result from step S8 is affirmative if the stylus pressure value in the coordinate data detected at S3 has changed from a value larger than 0 to 0, and negative if otherwise.

If the student terminal 2 determines that no penup has occurred at S8, then the student terminal 2 records the coordinate data detected at S3 (step S9) and thereafter has its process go back to S2. If, conversely, the student terminal 2 determines that a penup has occurred at S8, then the student terminal 2 records the present time as a stroke end time (S10), generates pieces of stroke data according to the pieces of data (the stroke start time, the series of coordinate data, and the stroke end time) recorded after the pendown, and records the generated pieces of stroke data in association with the question ID specified at S5 and the stroke ID decided on at S6 (S11). Thereafter, the student terminal 2 has its process go back to S2.

If the student terminal 2 determines that the submission button has been pressed at S2, then the student terminal 2 generates answer ink data including all pieces of the recorded stroke data with respect to each question ID and sends the generated answer ink data together with the student ID to the ink server 4 (S12). The ink server 4 that has received the answer ink data thus sent stores the received answer ink data in association with the received corresponding student ID in the ink database 6.

Figure 6:
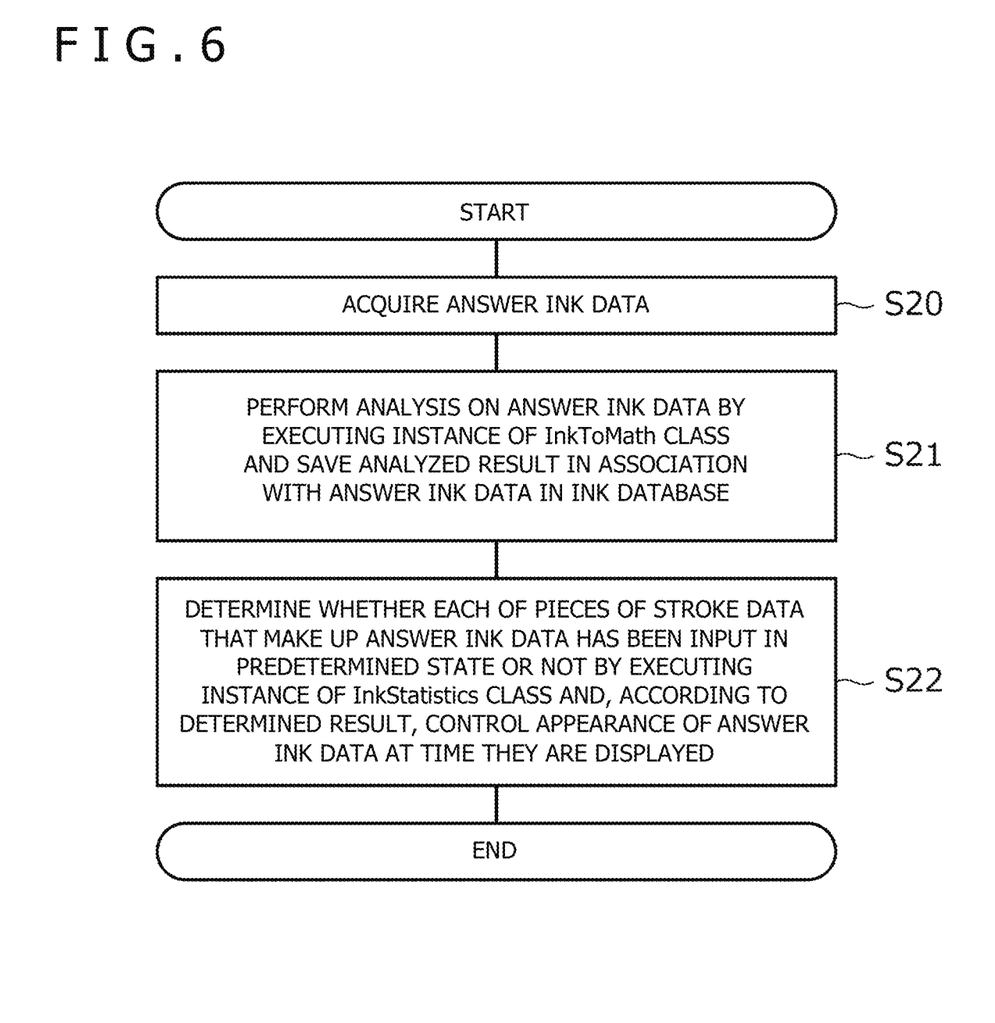
FIG. 6 is a diagram illustrating a process carried out by the ink server 4 that has stored answer ink data in an ink database 6.

FIG. 6 is a diagram illustrating a process carried out by the ink server 4 that has stored answer ink data in the ink database 6. The ink server 4 may carry out the process illustrated in FIG. 6 immediately after it has stored answer ink data in the ink database 6 or may carry out the process illustrated in FIG. 6 by way of batch processing.

As illustrated in FIG. 6, the ink server 4 first acquires answer ink data from the ink database 6 (S20). Then, the ink server 4 performs an analysis on the answer ink data by executing an instance of the InkToMath class for performing a mathematical analysis of the ink data, for example, and saves the analyzed result in association with the answer ink data in the ink database 6 (S21). The analyzed result thus saved will be used when the ink server 4 subsequently generates an answer window and can also be used when the ink data 4 carries out S22.

The ink server 4 that has carried out step S21 determines whether each of the pieces of stroke data that make up the answer ink data acquired at S20 has been input in a predetermined state or not by executing an instance of the InkStatistics class for performing a statistical analysis of the ink data, for example. Then, according to the determined result, the ink server 4 controls the appearance of the answer ink data at the time they are displayed (S22). The predetermined state against which each of the pieces of stroke data is to be determined is not limited to any specific contents. However, it is preferable to use as the predetermined state a state in which each stroke data is input without suffering a setback (i.e., without an interruption over a given period of time or longer) while an answer is being written, a state in which each stroke data is input in a predetermined order, or a state in which each stroke data is input while the stylus is being held in a predetermined tilt range.

Figure 7:
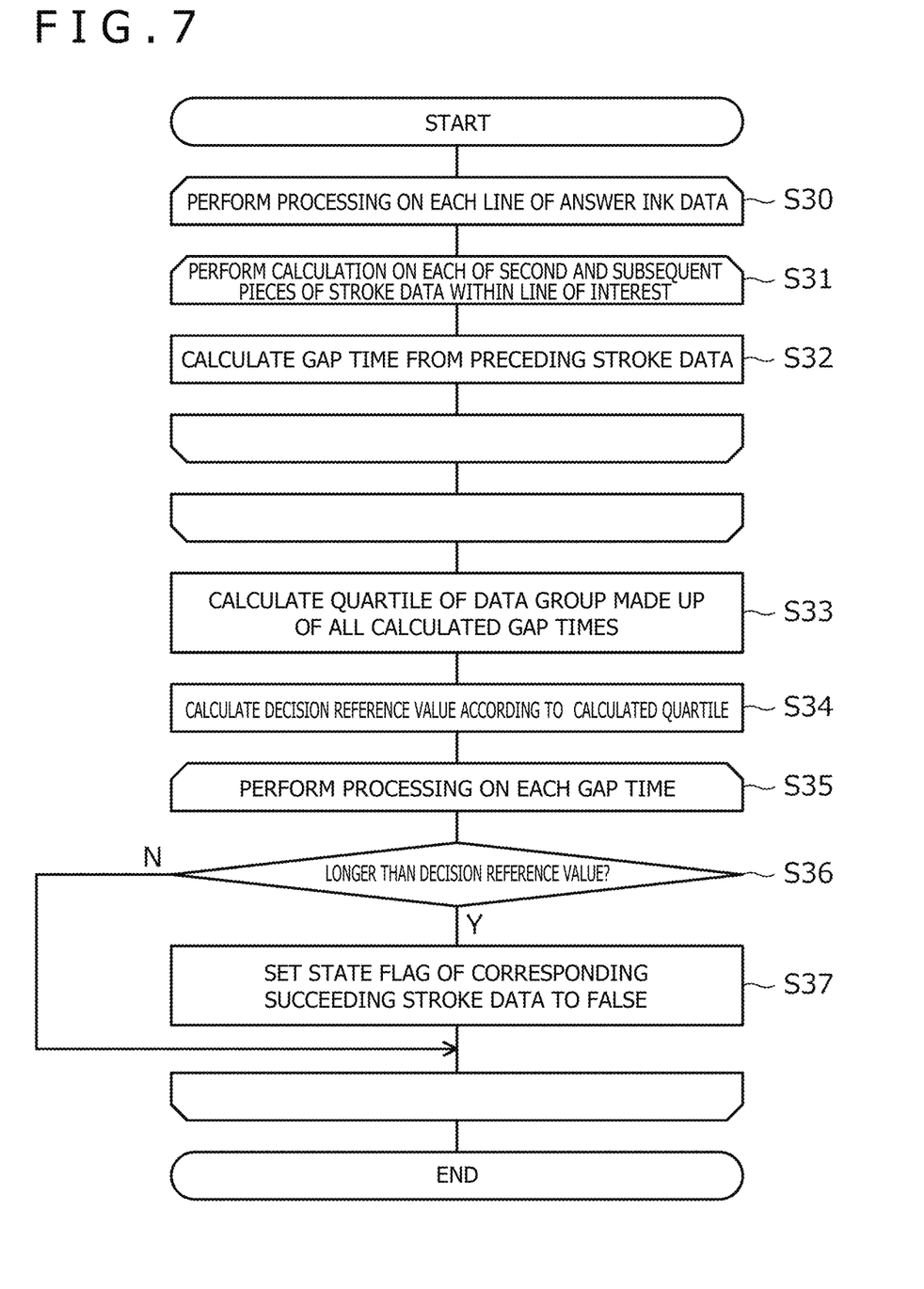
FIG. 7 is a processing flowchart illustrating a specific example of the process carried out by the ink server 4 at S22 illustrated in FIG. 6.

FIG. 7 is a processing flowchart illustrating a specific example of the process carried out by the ink server 4 at S22 illustrated in FIG. 6. The example illustrated in FIG. 7 uses the state in which each stroke data is input without suffering a setback while an answer is being written as the predetermined state against which each of the stroke data is to be determined. Furthermore, FIG. 7 illustrates by way of example a process that uses the analyzed result obtained at S21 illustrated in FIG. 6 as a preprocess for performing the processing of S22.

Specifically, the ink server 4 first performs the processing of steps S31 and S32 on each line of the answer ink data represented by the analyzed result obtained at S21 illustrated in FIG. 6 (S30). More specifically, the ink server 4 carries out a process of calculating a gap time that represents a period of time after the inputting of preceding stroke data has finished until the inputting of stroke data of interest starts, on each of second and subsequent pieces of stroke data within a line of interest (S31, S32). The ink server 4 may carry out the calculation at S32 according to the time stamp (the stroke start time and the stroke end time) included in each stroke data.

Then, the ink server 4 calculates a quartile of a data group made up of all calculated gap times (S33), and calculates a decision reference value according to the calculated quartile (S34). For example, the ink server 4 may calculate as the decision reference value a third quartile (the median of a data group made up of data larger than the median of all pieces of data) of the data group made up of all the calculated gap times.

Subsequently, the ink server 4 performs the processing of S36 and S37 on each of the gap times calculated at S30 through S32 (S35). Specifically, the ink server 4 determines whether a gap time of interest is longer than the decision reference value or not (S36), and, if it determines that the gap time of interest is longer than the decision reference value, the ink server 4 sets the state flag of the corresponding succeeding stroke data (see FIG. 3) to false (S37). The state flag represents Boolean data indicative of whether the corresponding stroke data has been input in the predetermined state or not. When the state flag is false, it indicates that the corresponding stroke data has not been input in the predetermined state. The state flag has a default value of true, and the state flag of the stroke data that has not been set to false is true.

That a certain gap time is longer than the decision reference value means that the student was unable to input smoothly the stroke data positioned immediately after the gap time (i.e., the student suffered a setback). Therefore, the processing of S36 can be rephrased as a process of determining whether the corresponding stroke data has been input in the predetermined state or not. Moreover, according to the rendering of answer ink data carried out at S42 (see FIG. 8) to be described later, the rendering color of the stroke data is changed according to the state flag set at S37. Consequently, the processing of S37 can be rephrased as a process of controlling the appearance of answer ink data at the time they are displayed on the basis of the determined result from S36.

Figure 8:
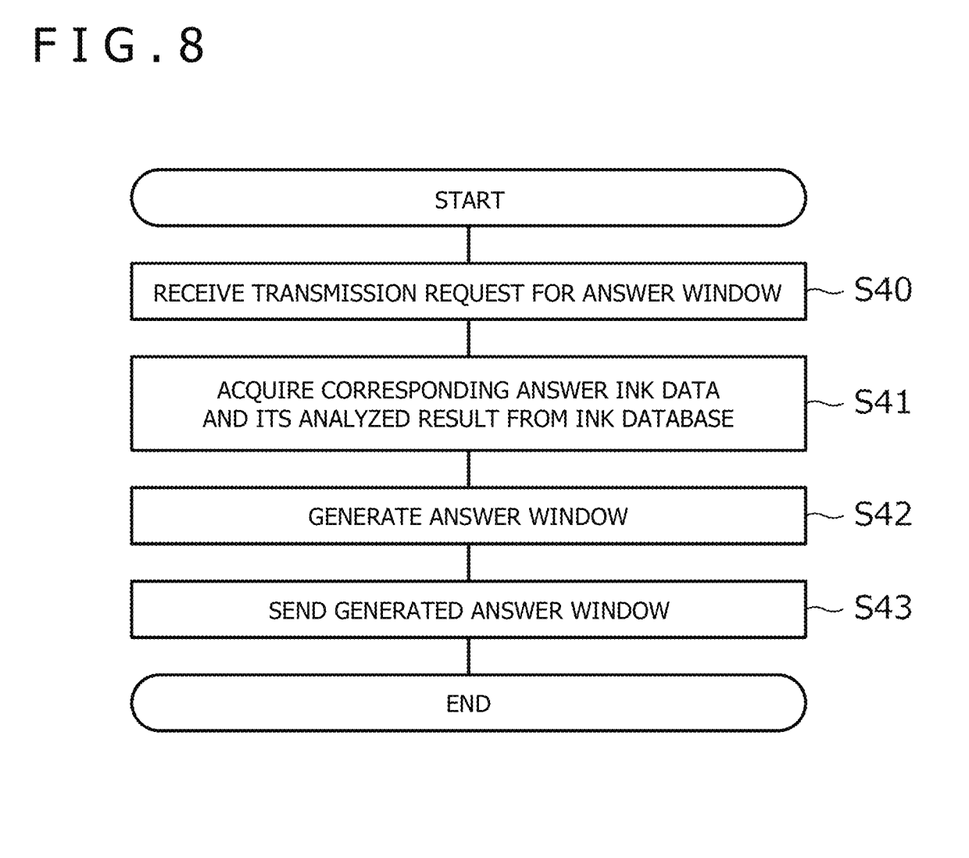
FIG. 8 is a diagram illustrating a process carried out by the ink server 4 in response to a transmission request for an answer window from the teacher terminal 3.

FIG. 8 is a diagram illustrating a process carried out by the ink server 4 in response to a transmission request for an answer window from the teacher terminal 3. When the ink server 4 receives a transmission request for an answer window from the teacher terminal 3 (S40), the ink server 4 acquires corresponding answer ink data and its analyzed result from the ink database 6 (S41). The transmission request for an answer window includes a student ID and a question ID. Using the student ID and the question ID as keys, the ink server 4 searches the ink database 6 for answer ink data and its analyzed result.

Then, the ink server 4 generates a requested answer window (S42). While generating a requested answer window, the ink server 4 performs a process of performing rendering of the answer ink data acquired at S41 and placing the result of the rendering together with the analyzed result acquired at S41 in the answer window. When performing the rendering of the answer ink data, the ink server 4 uses different rendering colors for stroke data whose state flag is true and stroke data whose state flag is false. Consequently, the stroke data input in the predetermined state (in the example illustrated in FIG. 7, the state in which stroke data is input without suffering a setback) and the stroke data not input in the predetermined state have different rendering colors.

As described above, with the ink data processing system 1 according to the present embodiment, the appearance of the answer ink data displayed on the teacher terminal 3 is controlled depending on whether each of the stroke data making up the answer ink data has been input in the predetermined state or not. Therefore, the teacher is able to realize with ease whether the student has been able to answer in an expected state or not from the appearance of the answer ink data.

Moreover, with the ink data processing system 1 according to the present embodiment, since the decision reference value for certain answer ink data is calculated on the basis of a quartile of a data group made up of all gap times calculated with respect to the answer ink data, it is possible to achieve appropriate appearance control matching individual qualities (e.g., a writing speed) of the student.

Furthermore, with the ink data processing system 1 according to the present embodiment, since gap times are calculated with respect to each line represented by the analyzed result of the answer ink data, the stroke data positioned at the beginning of a line that tends to have a large gap time between itself and the last stroke data from the preceding line can be excluded from appearance control. However, gap times may be calculated without using the analyzed result of the answer ink data. In this case, the stroke data positioned at the beginning of the line can be included for appearance control.

Although the preferred embodiment of the present disclosure has been described above, it will be understood that the present disclosure is in no way limited to the embodiment and may be practiced in various forms without departing from the scope thereof.

For example, according to the above embodiment, the state in which each stroke data is input without suffering a setback while an answer is being written has been described in detail by way of example as the predetermined state against which each of the stroke data is to be determined at S21 illustrated in FIG. 6. However, it is clear that other states can also be used. For example, a state in which each stroke data is input in a predetermined order may be used as the predetermined state. In such a case, the ink server 4 may determine whether a plurality of pieces of stroke data making up answer ink data have been input in a predetermined state or not on the basis of the stroke IDs of the respective pieces of stroke data and the predetermined order referred to above. This determining process is particularly effective for questions about how to write Kanji characters, for example. According to another example, a state in which each stroke data is input while the stylus is being held in a predetermined tilt range may be used as the predetermined state. In this case, the ink server 4 may determine whether a plurality of pieces of stroke data making up answer ink data have been input in a predetermined state or not on the basis of tilt data included in each stroke data and the above predetermined tilt range. The determining process is particularly effective for occasions where infants are instructed to grip the stylus P, for example.

According to the above embodiment, in addition, a predetermined state of only one kind has been described as the state against which each of the pieces of stroke data is to be determined at S21 illustrated in FIG. 6. However, predetermined states of a plurality of kinds may be used as the states against which each of the pieces of stroke data is to be determined. In this case, it is preferable to include a plurality of state flags corresponding to the respective predetermined states in stroke data.

According to the above embodiment, furthermore, state flags included in stroke data have been described by way of example. However, the ink server 4 or the ink database 6 may hold data representing state flags separately from stroke data, and may control the appearance of answer ink data at the time they are displayed on the basis of the data thus held. Alternatively, if each stroke data has a rendering color as meta data, then the appearance of stroke data at the time they are displayed may be controlled by changing the rendering color as the meta data.

According to the above embodiment, moreover, the appearance of answer ink data at the time they are displayed is controlled by changing the rendering color of stroke data by way of example. However, the appearance of answer ink data at the time they are displayed may be controlled by other methods. For example, the appearance of answer ink data at the time they are displayed may be controlled by changing the line width and transparency of stroke data and the presence and absence of broken lines surrounding stroke data.

According to the above embodiment, furthermore, the appearance of answer ink data is controlled within the answer window displayed on the teacher terminal 3. However, the ink data processing system 1 may be configured to have the student terminal 2 display similarly controlled ink data at the time the student confirms their answers. The ink data processing system 1 thus configured allows the student to know whether they have been able to answer in an expected state or not.

According to the above embodiment, moreover, the appearance of the result of the rendering of the answer ink data displayed in the answer window is controlled. However, the appearance of the result of the character recognition displayed in the answer window may similarly be controlled. The appearance of the result of the character recognition thus controlled makes it possible to realize whether the student has answered in an expected state with characters that are easy to read.

According to the above embodiment, in addition, when the answer window is generated at S42 illustrated in FIG. 8, the ink server 4 performs the rendering by using different rendering colors for stroke data whose state flag is true and stroke data whose state flag is false. However, the ink server 4 may determine a plurality of pieces of stroke data making up characters or character strings including stroke data whose state flag is false on the basis of the result of the character recognition, and may perform rendering by using different rendering colors for the determined plurality of pieces of stroke data and other pieces of stroke data. This alternative allows the teacher to realize whether the student has answered in an expected state or not by way of a more abstract unit of information than individual pieces of stroke data. As an example, if the student suffers a setback in writing a quadratic equation, then the rendering color of all pieces of stroke data making up the quadratic equation may be made different from other pieces of stroke data, allowing the teacher to realize whether the student has suffered a setback while an answer is being written or not by way of the unit of the quadratic equation.

DESCRIPTION OF REFERENCE SYMBOLS

1: Ink data processing system
2: Student terminal
3: Teacher terminal
4: Ink server
5: Network
6: Ink database
100: Computer
101: CPU
102: Storage device
103: Input device
104: Output device
105: Communication device
106: Bus The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer comprising:
a processor; and
a memory storing a program that, when executed by the processor, causes the computer to:
acquire a plurality of pieces of stroke data,
determine whether the pieces of stroke data have been input in a particular state,
control a display state when the pieces of stroke data are displayed based on a result of determining whether the pieces of stroke data have been input in the particular state,
calculate a gap time that represents a period of time after input of first stroke data has finished until input of second stroke data temporally adjacent to the first stroke data starts based on time stamps included in respective ones of the plurality of pieces of stroke data, and
determine that the second stroke data has not been input in the particular state if the gap time is longer than a particular decision reference value, and
control the display state such that the second stroke data is rendered in a color different from the first stroke data if the gap time is longer than the particular decision reference value.

2. The computer according to claim 1, wherein the particular state is a state in which the pieces of stroke data are input without an interruption over a particular period of time or longer.

3. The computer according to claim 1, wherein the program, when executed by the processor, causes the computer to determine that the pieces of stroke data have been input in the particular state when the pieces of stroke data have been input in a particular order.

4. The computer according to claim 1, wherein the program, when executed by the processor, causes the computer to determine that the pieces of stroke data have been input in the particular state when the pieces of stroke data have been input with a stylus being held in a particular tilt range.

5. A computer comprising:
a processor; and
a memory storing a program that, when executed by the processor, causes the computer to:
acquire a plurality of pieces of stroke data,
determine whether the pieces of stroke data have been input in a particular state,
control a display state when the pieces of stroke data are displayed based on a result of determining whether the pieces of stroke data have been input in the particular state, and
calculate a gap time that represents a period of time after input of first stroke data has finished until input of second stroke data temporally adjacent to the first stroke data starts based on time stamps included in respective ones of the plurality of pieces of stroke data, and
determine that the second stroke data has not been input in the particular state if the gap time is longer than a particular decision reference value, and
calculate the particular decision reference value according to a quartile of a data group including the gap time.

6. The computer according to claim 5, wherein the program, when executed by the processor, causes the computer to calculate a third quartile of the data group as the particular decision reference value.

7. The computer according to claim 5, wherein the program, when executed by the processor, causes the computer to:
　　associate each of the pieces of stroke data with one of a plurality of lines, and
　　calculate the gap time with respect to the pieces of stroke data included in the lines.

8. The computer according to claim 5, wherein the particular state is a state in which the pieces of stroke data are input without an interruption over a particular period of time or longer.

9. The computer according to claim 5, wherein the program, when executed by the processor, causes the computer to determine that the pieces of stroke data have been input in the particular state when the pieces of stroke data have been input in a particular order.

10. The computer according to claim 5, wherein the program, when executed by the processor, causes the computer to determine that the pieces of stroke data have been input in the particular state when the pieces of stroke data have been input with a stylus being held in a particular tilt range.

11. A stroke data display control method comprising:
　　acquiring, by a computer, a plurality of pieces of stroke data;
　　determining, by the computer, whether the pieces of stroke data have been input in a particular state; and
　　controlling, by the computer, a display state when the pieces of stroke data are displayed based on a result of the determining;
　　calculating a gap time that represents a period of time after input of first stroke data has finished until input of second stroke data temporally adjacent to the first stroke data starts based on time stamps included in respective ones of the plurality of pieces of stroke data;
　　wherein the determining includes determining that the second stroke data has not been input in the particular state if the gap time is longer than a particular decision reference value, and
　　wherein the controlling the display state includes controlling the display state such that the second stroke data is rendered in a color different from the first stroke data if the gap time is longer than the particular decision reference value.

12. The stroke data display control method according to claim 11, wherein the particular state is a state in which the pieces of stroke data are input without an interruption over a particular period of time or longer.

13. The stroke data display control method according to claim 11, wherein the determining includes determining that the pieces of stroke data have been input in the particular state when the pieces of stroke data have been input in a particular order.

14. The stroke data display control method according to claim 11, wherein the determining includes determining that the pieces of stroke data have been input in the particular state when the pieces of stroke data have been input with a stylus being held in a particular tilt range.

15. A stroke data display control method comprising:
　　acquiring, by a computer, a plurality of pieces of stroke data;
　　determining, by the computer, whether the pieces of stroke data have been input in a particular state; and
　　controlling, by the computer, a display state when the pieces of stroke data are displayed based on a result of the determining;
　　calculating a gap time that represents a period of time after input of first stroke data has finished until input of second stroke data temporally adjacent to the first stroke data starts based on time stamps included in respective ones of the plurality of pieces of stroke data;
　　wherein the determining includes determining that the second stroke data has not been input in the particular state if the gap time is longer than a particular decision reference value, and
　　wherein the calculating the gap time includes calculating the particular decision reference value according to a quartile of a data group including the gap time.

16. The stroke data display control method according to claim 15, wherein the calculating the gap time includes calculating a third quartile of the data group as the particular decision reference value.

17. The stroke data display control method according to claim 15, further comprising:
　　associating each of the pieces of stroke data with one of a plurality of lines;
　　wherein the calculating the gap time includes calculating the gap time with respect to the pieces of stroke data included in the lines.

18. The stroke data display control method according to claim 15, wherein the particular state is a state in which the pieces of stroke data are input without an interruption over a particular period of time or longer.

19. The stroke data display control method according to claim 15, wherein the determining includes determining that the pieces of stroke data have been input in the particular state when the pieces of stroke data have been input in a particular order.

20. The stroke data display control method according to claim 15, wherein the determining includes determining that the pieces of stroke data have been input in the particular state when the pieces of stroke data have been input with a stylus being held in a particular tilt range.

* * * * *